United States Patent Office 3,340,104
Patented Sept. 5, 1967

3,340,104
WELDING FLUX
John T. Ballass and Bernard J. Freedman, Groton, Conn., assignors to General Dynamics Corporation, New York, N.Y., a corporation of Delaware
No Drawing. Filed Apr. 29, 1965, Ser. No. 451,977
7 Claims. (Cl. 148—26)

ABSTRACT OF THE DISCLOSURE

A welding flux in which the fluxing ingredients consist essentially of, by weight, up to about 15% aluminum oxide, up to about 15% manganous oxide, from about 5% to about 35% calcium fluoride, from about 15% to about 50% sodium aluminum fluoride, and the balance being essentially silicon dioxide and calcium oxide in an approximate ratio by weight of silicon dioxide to calcium oxide within the range of about 2:1 to about 1:1. The calcium fluoride and sodium aluminum fluoride are present in amounts totalling not less than about 35% by weight. The flux is particularly suited for use in the welding of low alloy, high strength steels and provides a weldment having significantly improved mechanical properties and a smooth finish.

---

This invention relates to welding flux and, in particular, to a welding flux suitable for use in the welding of low alloy, high strength steels.

To obtain a high quality weldment, it is necessary that a welding flux be utilized in order to provide a protective covering for the metal at the welding site to prevent oxidation of and other undesirable changes in the metal during welding. The particular welding flux utilized depends upon the type of metal being welded and upon the welding process used.

The welding flux of the present invention is intended for use in welding steel, and especially low alloy, high strength steels. While it is satisfactory for a number of welding techniques, for example, the Electro-Slag method, it is particularly well suited for use in the submerged-arc welding process. The submerged-arc welding process employs a blanket of molten flux to shield a welding wire electrode and the molten base metal of the parts being welded from the atmosphere. Fluxes used in submerged arc processes are compositions of granular fusible materials which are deposited onto the work around the end of the wire electrode and the base metal in the region of melting. The submerged-arc process is widely used because of its advantages, among others, of being readily adapted to the use of automatic equipment, of being carried out at speeds significantly higher than most other known welding techniques and of providing welds of large thickness.

In our copending applications (1) for "Welding Flux," Ser. No. 127,485, filed July 28, 1961, now Patent No. 3,192,076, and (2) for "Welding Flux," Ser. No. 196,875, filed May 23, 1962, now Patent No. 3,192,077, we have disclosed welding fluxes particularly well suited for low alloy, high strength steels which provide welds having particularly high notch toughnesses and other mechanical properties. While the fluxes as disclosed in those applications are entirely satisfactory, they are expensive to make.

We have now discovered a novel and improved welding flux which is significantly less costly than fluxes of our previous applications referred to above and which provides welds having mechanical properties generally comparable to those obtained using the fluxes of those applications. Because the flux of the present invention is low in cost, it is also of practical use in welding low grade steels as well as for high strength steels. The new flux provides welds having especially high strength and high notch toughness. Additionally, the new flux is highly fluid when fused during the welding operation and accordingly produces a smooth surface on the weld, thereby facilitating the removal of the slag over the weld.

The welding flux of the present invention comprises a mixture consisting essentially of, by weight, up to 15% aluminum oxide ($Al_2O_3$), up to 15% manganous oxide (MnO), 5% to 35% calcium fluoride ($CaF_2$), 15 to 50% sodium aluminum fluoride ($Na_3AlF_6$) and the balance silicon dioxide ($SiO_2$) and calcium oxide (CaO), the latter two ingredients being present in amounts within the range of proportion by weight of $SiO_2$ to CaO of from about 2:1 to about 1:1 and the calcium fluoride and sodium aluminum fluoride being present in amounts aggregating not substantially less than 35% by weight.

The raw materials used in preparing the fluxes of the invention are preferably of the usual commercial purity, although incidental impurities do not usually affect the function of the welding flux appreciably. The raw materials are preferably of a particle size such that all pass through a 50-mesh screen. To prepare the fluxes, silica, lime, alumina, manganous oxide, fluorspar and cryolite are combined in preselected proportions and mixed in the dry state to obtain a uniform mixture. The silica may be of a mineral grade containing at least 90% $SiO_2$ and a maximum of 5% aluminum. The lime may also be of a commercial grade and contain at least 92% CaO after drying at 2000° F., and it may also contain a maximum of 1.5% magnesium and 2% aluminum. The manganous oxide may also be of a commercial grade containing a minimum Mn content of 45%, maximum Fe content of 8%, a maximum Al content of 5%, a maximum content of 1% of Zn, As and Pb and a maximum Ba content of 2%. The alumina is calcined, is of a commercial grade, and contains 99% $Al_2O_3$ after drying at 2000° F. The fluorspar is of a mineral grade, containing at least 95% $CaF_2$. The cryolite may be of a technical grade.

The welding flux of this invention may be made utilizing the above mentioned raw materials by any of the conventional methods employed in the art, that is, by the fusion, the sintering, or the bonding methods.

In the fusion technique, the raw materials are mechanically mixed with each other and the mixture placed in a graphite crucible and heated to about 2400 to 2600° F. until it melts. After heating the molten mixture for about 20 more minutes to ensure complete fusion, it is quenched to room temperature and then ground and crushed.

To produce the flux by the sintering technique, a mechanical mixture of the constituents is heated in an oven at about 1650° F. for about 1½ hours. The mixture is then cooled, crushed, screened to obtain the desired particle distribution and used in the same manner as the fused materials.

When the flux is prepared according to a bonding technique, the mixture of constituents is combined with water glass in a ratio of about one part of water glass to three parts of the flux mixture. This mass is then heated to 900° F. for about three hours, crushed, screened and employed in the usual manner. Of the three suitable methods for preparing the flux, the fusion technique is generally preferred.

Table 1 below lists a number of specific examples of the welding flux of the present invention which have been prepared by the fusion method. The analyses were determined on the constituent mixtures prior to fusion.

TABLE 1.—ANALYSIS OF FLUX IN PERCENTAGE BY WEIGHT

| Flux | SiO₂ | CaO | Al₂O₃ | MnO | CaF₂ | Na₃AlF₆ |
|---|---|---|---|---|---|---|
| A | 27 | 13 | 15 | 5 | 5 | 35 |
| B | 27 | 13 | 10 | 5 | 10 | 35 |
| C | 27 | 13 | 15 | 10 | 10 | 25 |
| D | 27 | 13 | 15 | 10 | 5 | 30 |
| E | 27 | 13 | 15 | | 10 | 35 |
| F | 27 | 13 | | 15 | 10 | 35 |
| G | 37 | 18 | | | 10 | 35 |
| H | 20 | 20 | 10 | 5 | 10 | 35 |
| I | 27 | 13 | 15 | 5 | 25 | 15 |
| J | 25 | 12 | 9 | 4 | 10 | 40 |
| K | 22 | 10 | 6 | 2 | 10 | 50 |
| L | 27 | 13 | 15 | 5 | 20 | 20 |
| M | 25 | 12 | 9 | 4 | 35 | 15 |
| N | 20 | 20 | 15 | | 10 | 35 |

The foregoing flux compositions were utilized to weld HY-80 steel, which is an exemplary high strength low alloy steel having a yield strength (0.2% offset) of between about 80,000 and 100,000 p.s.i. HY-80 steel has the following chemical composition:

| Element: | Percentage by weight |
|---|---|
| Carbon | max__ .22 |
| Manganese | .1 to .4 |
| Phosphorus | max__ .035 |
| Sulphur | max__ .04 |
| Silicon | .15 to .35 |
| Nickel | 2 to 2.75 |
| Chromium | .9 to 1.4 |
| Molybdenum | .23 to .35 |

The complete specifications of HY-80 steel may be found in U.S. Government Specification MIL-S-16216D (NAVY).

The welds were made utilizing a welding wire 5/32" in diameter, and having the following chemical analysis in percent by weight:

| Element: | Percentage by weight |
|---|---|
| C | .09 |
| S | .004 |
| P | .006 |
| Si | .74 |
| Mn | 1.40 |
| Cr | .04 |
| Ni | 1.03 |
| Cu | .48 |
| Mo | .28 |
| Zr | .076 |

Welds were made with the above-described 5/32" diameter welding wire in 1" thick HY-80 steel plates with a single V 45° bevel groove butt joint, and mechanical tests, the results of which are set forth in Table 2, were made. A heat input of 44,500 joules/inch was provided by direct current reverse polarity at 550 amperes, arc current, and 27 volts, arc voltage, with the electrode moving along at the weld joint at 20 inches per minute. Another weld, using flux, was made in the same manner but at a heat input of about 54,000 joules/inch provided by direct current reverse polarity at 600 amperes, arc current, and 30 volts, arc voltage, and the test results for this weld are designated by an asterisk (*) in Table 2. The welding wire electrodes were bare metal, and the granulated flux was supplied to the weld in sufficient quantities by gravity feed concentric with the welding electrode.

TABLE 2.—MECHANICAL PROPERTIES OF WELD METAL

| Welding Flux | Tensile Strength, p.s.i. | Yield Strength (0.2 offset), p.s.i. | Elongation, percent, 1.4" | Reduction of Area, percent | Charpy V-notch Impact Toughness Impact Energy in ft. lbs. | | | |
|---|---|---|---|---|---|---|---|---|
| | | | | | Room Temp. | 0° F. | -60° F. | -80° F. |
| A | 106,000 | 85,000 | 26.3 | 61.0 | 89 | 74 | 53 | 43 |
| B | 109,500 | 86,000 | 26.3 | 64.0 | 102 | 73 | 44 | 43 |
| C | 108,300 | 88,500 | 26.3 | 65.6 | 86 | 60 | 43 | 29 |
| D | 104,300 | 82,300 | 20.0 | 61.7 | 90 | 61 | 43 | 34 |
| E | 105,400 | 86,100 | 25.0 | 68.3 | 110 | 92 | 56 | 48 |
| F | 110,000 | 89,500 | 14.0 | 39.0 | 109 | 77 | 37 | 29 |
| G | 102,500 | 84,000 | 25.0 | 59.0 | 99 | 63 | 29 | 24 |
| H | 113,500 | 92,000 | 20.7 | 45.0 | 106 | 95 | 52 | 34 |
| I | 116,500 | 92,000 | 23.0 | 60.8 | 93 | 61 | 46 | 32 |
| J | 113,000 | 90,000 | 23.0 | 58.9 | 94 | 64 | 46 | 41 |
| K | 113,000 | 86,000 | 24.0 | 63.0 | 89 | 75 | 48 | 41 |
| L | 114,750 | 97,000 | 20.0 | 60.7 | 92 | 79 | 59 | 45 |
| M | 111,000 | 87,000 | 26.0 | 64.6 | 91 | 67 | 34 | 26 |
| N | 114,500 | 87,000 | 23.0 | 59.6 | 91 | 64 | 42 | 34 |
| I * | 110,400 | 88,100 | 25.0 | 62.4 | 96 | 75 | 43 | 35 |

It is apparent from Table 2 that the welding flux of the invention provides a weld having mechanical properties similar to those of the base metal. Of particular interest is the high notch toughness of the welds obtained utilizing the welding flux of the invention. While the notch toughness properties of all the welds given in Table 2 are high, it has been found that the preferred flux composition range is given by fluxes E, F, H, I, and M. This preferred range is based on ease of slag removal after welding and smoothness of the resulting weld bead which consequently results in a minimum cost of weld finishing and repair both during and after welding.

The flux of this invention may be used in other welding methods, for example, the flux can be used as the flux core of a hollow tubular welding wire. Further, the addition of certain materials to the flux core which form a vapor shield over the welding site is contemplated, such as in the method described in the article by R. A. Wilson in "Welding Journal," vol. 40, No. 1, January 1961. Furthermore, the flux of this invention can be mixed with metallic particles having, for example, the same analysis as the welding wire or as the steel being joined. This type of flux mixture is well known in the art, and because it is attracted to the welding site by magnetism in electric welding, it can be used in situations where a gravity feed of flux cannot be provided.

It will be understood by those skilled in the art that the above described embodiments of the invention are exemplary and that many variations and modifications thereof can be made by those skilled in the art without departing from the spirit and scope of the invention. All such variations and modifications are intended to be included within the scope of the invention as defined in the appended claims.

We claim:

1. A welding flux in which the fluxing ingredients consist essentially of, by weight, up to about 15% aluminum oxide, up to about 15% manganous oxide, from about 5% to about 35% calcium fluoride, from about 15% to about 50% sodium aluminum fluoride and the balance being essentially silicon dioxide and calcium oxide in an approximate ratio by weight of silicon dioxide to calcium oxide within the range of about 2:1 to about 1:1, the calcium fluoride and sodium aluminum fluoride being present in amounts aggregating not substantially less than 35% by weight.

2. A welding flux in which the fluxing ingredients consist essentially of, by weight, up to about 15% aluminum oxide, up to about 15% manganous oxide, from about 10% to about 35% calcium fluoride, from about 15% to about 30% sodium aluminum fluoride, and the balance being essentially silicon dioxide and calcium oxide in approximate ratio by weight of silicon dioxide to calcium oxide within the range of about 2:1 to about 1:1, the calcium fluoride and sodium aluminum fluoride being present in amounts aggregating not substantially less than about 40% by weight.

3. A welding flux in which the fluxing ingredients consist essentially of, by weight about 15% aluminum oxide, about 10% calcium fluoride, about 35% sodium aluminum fluoride, and the balance being essentially silicon dioxide and calcium oxide in an approximate ratio by weight of silicon dioxide to calcium oxide within the range of about 2:1 to about 1:1.

4. A welding flux in which the fluxing ingredients consist essentially of, by weight, about 15% manganous oxide, about 10% calcium fluoride, about 35% sodium aluminum fluoride and the balance being essentially silicon dioxide and calcium oxide in an approximate ratio by weight of silicon dioxide to calcium oxide within the range of about 2:1 to about 1:1.

5. A welding flux in which the fluxing ingredients consist essentially of, by weight, about 10% aluminum oxide, about 5% manganous oxide, about 10% calcium fluoride, about 35% sodium aluminum fluoride, and the balance being essentially silicon dioxide and calcium oxide in an approximate ratio by weight of silicon dioxide to calcium oxide within the range of about 2:1 to about 1:1.

6. A welding flux in which the fluxing ingredients consist essentially of, by weight, about 15% aluminum oxide, about 5% manganous oxide, about 25% calcium fluoride, about 15% sodium aluminum fluoride, and the balance being essentially silicon dioxide and calcium oxide in an approximate ratio by weight of silicon dioxide to calcium oxide within the range of about 2:1 to about 1:1.

7. A welding flux in which the fluxing ingredients consist essentially of, by weight, about 9% aluminum oxide, about 4% manganous oxide, about 35% calcium fluoride, about 15% sodium aluminum fluoride, and the balance being essentially silicon dioxide and calcium oxide in an approximate ratio by weight of silicon dioxide to calcium oxide within the range of about 2:1 to about 1:1.

References Cited

UNITED STATES PATENTS

| | | | |
|---|---|---|---|
| 2,802,762 | 8/1957 | Stetson et al. | 148—26 |
| 2,805,178 | 9/1957 | Garriott | 148—26 |
| 3,192,076 | 6/1965 | Ballass et al. | 148—26 |

HYLAND BIZOT, *Primary Examiner.*

DAVID L. RECK, *Examiner.*

H. SAITO, *Assistant Examiner.*